United States Patent [19]

Kirk

[11] Patent Number: 5,556,146
[45] Date of Patent: Sep. 17, 1996

[54] CYLINDER GRIP

[76] Inventor: Robert E. Kirk, 641 Hwy. 12E, Townsend, Mont. 59644

[21] Appl. No.: 438,560

[22] Filed: May 10, 1995

[51] Int. Cl.⁶ .............................. B65D 63/18; B65G 7/12
[52] U.S. Cl. ........................................ 294/31.1; 294/92
[58] Field of Search .............................. 294/15, 16, 27.1, 294/31.2, 92, 119.2; 220/752, 755, 758

[56] References Cited

U.S. PATENT DOCUMENTS

| | | | |
|---|---|---|---|
| 1,247,355 | 11/1917 | Wildberger | 294/27.1 |
| 1,352,173 | 9/1920 | Campbell | 294/27.1 |
| 3,227,411 | 4/1963 | Treutler. | |
| 3,310,270 | 3/1967 | Ciancio | 294/31.2 X |
| 3,817,435 | 6/1974 | De Luca et al. | 294/31.2 X |
| 4,150,806 | 4/1979 | Dziuk. | |
| 4,294,481 | 10/1981 | Pearl. | |
| 4,345,789 | 8/1982 | Garnett | 294/31.2 |
| 4,486,044 | 10/1984 | Gordon et al. | |
| 4,560,193 | 12/1985 | Beebe | 294/31.2 |
| 4,753,474 | 6/1988 | Radford | 294/31.2 X |
| 4,754,893 | 7/1988 | Dunn | 294/31.2 X |
| 4,795,202 | 1/1989 | Mader | 294/31.2 X |
| 5,131,670 | 7/1992 | Clements et al. | |
| 5,346,165 | 9/1994 | Frean et al. | |

FOREIGN PATENT DOCUMENTS

| | | |
|---|---|---|
| 0584508A1 | 3/1994 | European Pat. Off. . |
| 2534466 | 4/1984 | France . |
| 101741 | 10/1923 | Switzerland ........................ 294/31.2 |
| 16980 | of 1906 | United Kingdom . |
| 758694 | 10/1956 | United Kingdom ................. 294/31.2 |

Primary Examiner—Johnny D. Cherry

[57] ABSTRACT

A grip for lifting and carrying gas cylinders, comprising a hoop which is circular and a handle attached to the hoop, wherein the diameter of the circle formed by the hoop is slightly larger than the diameter of the gas cylinders to be lifted and carried. In a preferred embodiment: the hoop and the handle are made from steel, and the handle is attached to the hoop by welding; the hoop is flat in a direction perpendicular to the plane of the circle formed by the hoop, so that the hoop forms a short cylinder, the axis of which passes through the center of the circle; the hoop is formed from a flat strip, which is bent to form the short cylinder; and the circle formed by the hoop is incomplete on the side where it is attached to the handle, the steel strip from which the hoop is formed being bent outward to attach it to the handle. The hoop is slipped around the gas cylinder to be lifted, and then the person using it lifts the cylinder, placing his hand, or a hook, rope or chain, on the handle, which causes the grip to cant so that it tightly frictionally engages the cylinder. The device can then be easily slipped off the gas cylinder, after it has been moved, by canting the grip back to its original angle.

10 Claims, 2 Drawing Sheets

CYLINDER GRIP

BACKGROUND OF THE INVENTION

1. Field of the Invention

The present invention relates to a grip for holding and carrying metal cylinders containing pressurized gas, or similar objects, comprising a circular hoop with a handle, by which the cylinders can be picked up and carried by hand, hook, rope or chain, when the hoop has been placed around them.

2. Description of the Prior Art

There have been previous inventions for the purpose of holding and/or carrying round or cylindrical objects, all of which are distinguishable from the instant invention.

U.S. Pat. No. 3,227,411, issued to Albert J. Truetler, on Jan. 4, 1966, discloses a paint can holder, comprising a hoop with a clamp for attaching it to a ladder, rather than a handle for carrying it by hand.

U.S. Pat. No. 4,150,806, issued to Vincent B. Dziuk, on Apr. 24, 1979, discloses a vehicle retainer for thermos bottles, by which a bottle is clamped in a fixed position within the passenger compartment of a motor vehicle.

U.S. Pat. No. 4,294,481, issued to Douglas B. Pearl, on Oct. 13, 1981, discloses a gas cylinder carrier, by which two cylinders can be carried at once, with a handle which extends in a direction parallel to the axes of the cylinders being carried. The instant invention can only carry one cylinder at a time, but is simpler and more lightweight, and it will take less space to store it in when it is not being used.

U.S. Pat. No. 4,486,044, issued to Harris K. Gordon and Howard Myers, on Dec. 4, 1984, discloses an apparatus for supporting and transporting a gas cylinder, with two hoops, a clamping structure, a base, and a handle parallel to the axis of the cylinder. Again, the instant invention is simpler and more light weight, and requires less storage space.

For the inventions in the Pearl and Gordon et al. patents, the gas cylinders will first have to be lifted by hand to place them in the carrying device. Gas cylinders tend to be heavy and difficult to grasp by hand. The instant invention can be placed on the cylinder merely by raising it on one side (preferably the side having the valve, if it has a narrow neck there) and slipping the hoop over the cylinder.

U.S. Pat. No. 5,131,670, issued to D. Gene Clements and Robert R. Morrison, on Jul. 21, 1992, discloses a detachable scuba tank overland transport device, by means of which a scuba tank may be wheeled about. The instant invention has no wheels.

U.S. Pat. No. 5,346,165, issued to Robert G. Frean and Leslie R. Moss, on Sep. 13, 1994, discloses a restraining device, having two hoops, by means of which a cylindrical object can be prevented from rolling on a flat surface.

British Patent No. 16,980, published Jan. 19, 1906, discloses a device for holding a bottle, such as a wine bottle, having on hoop for the bottom end of the bottle, and another hoop for the neck of the bottle.

French patent Application No. 2 534 466, published Apr. 20, 1984, discloses a device for holding a wine bottle by its neck by means of semi-circular jaws with handle extensions.

European Patent Application No. 0 584 508 A1, published Mar. 2, 1994, discloses a holding device for fastening containers of a round or oval cross section, having a hoop clamped around the container, but not a handle for carrying it.

None of the above inventions and patents, taken either singly or in combination, is seen to describe the instant invention as claimed.

SUMMARY OF THE INVENTION

Accordingly, it is a principal object of the invention to provide a convenient means for holding and carrying gas cylinders or similar objects by hand, or by means of a hook, rope or chain.

It is another object of the invention to provide a means for holding and carrying gas cylinders or similar objects, which can be quickly and conveniently slipped around the object to hold and carry it, and be just as easily removed.

It is a further object of the invention to provide a means for holding and carrying gas cylinders that is simple, lightweight, and requires little storage space.

It is a further object of the invention to improve safety in handling gas cylinders, by making it less likely that they will slip out of the grasp of the person lifting and/or carrying them, thus preventing personal injury and/or property damage, caused by the impact of the cylinders falling and even possibly exploding.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIGS. 1 and 2 are environmental perspective views of the invention wherein FIG. 2 is a partial view.

Similar reference characters denote corresponding features consistently throughout the attached drawings.

DETAILED DESCRIPTION OF THE PREFERRED EMBODIMENT

The present invention is a grip G for lifting and carrying gas cylinders 8 or similar objects, comprising a hoop 1 which is circular and a handle 2 attached to the hoop 1, wherein the diameter of the circle formed by the hoop is slightly larger than the diameter of the cylinders 8 to be lifted and carried.

Figure 1:
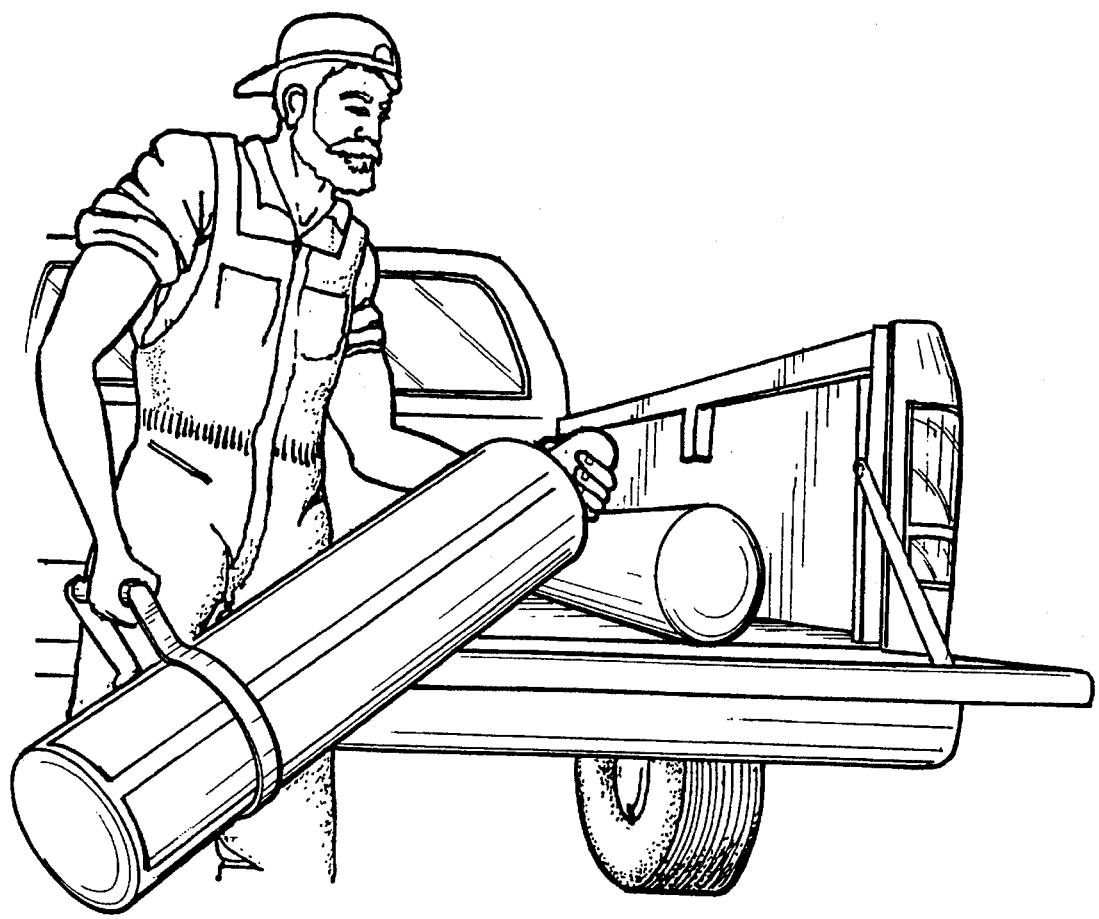
Figure 2:
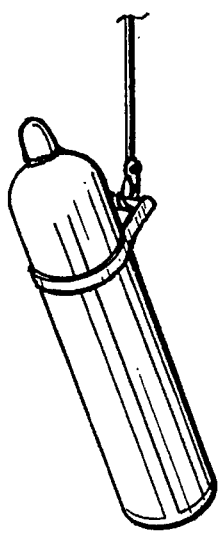
Figure 3:
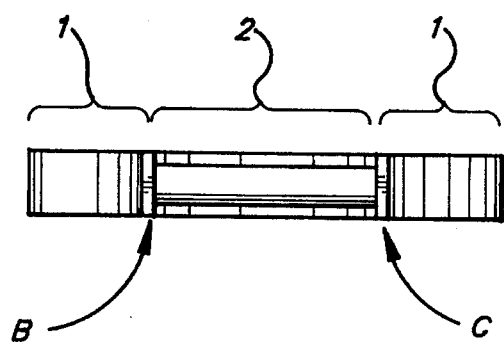
FIG. 3 is a top view of the invention, drawn to an enlarged scale.
Figure 4:
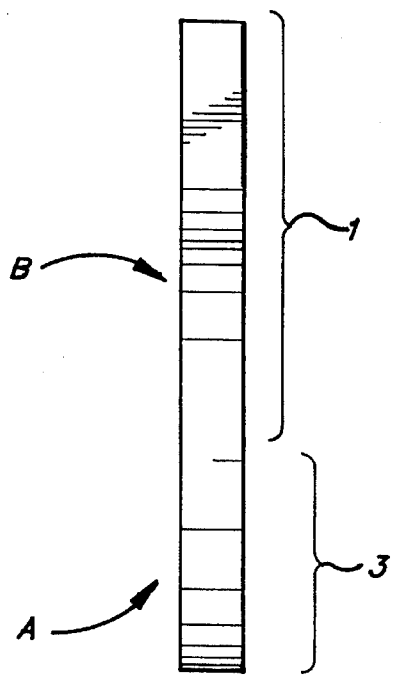
FIG. 4 is a side view of the invention.
Figure 5:
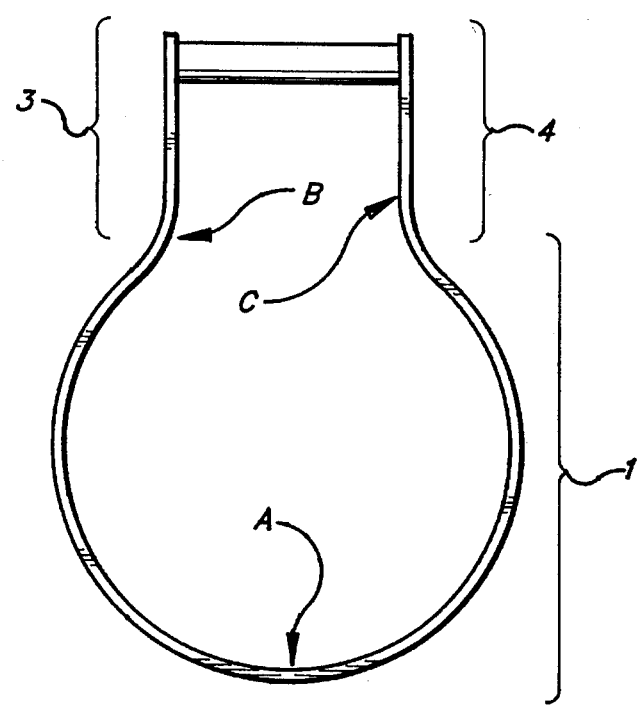
FIG. 5 is a front view of the invention.
Figure 6:
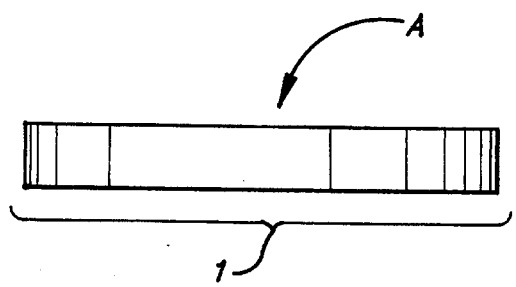
FIG. 6 is a bottom view of the invention.

In the preferred embodiment, seen in FIGS. 1–6, the hoop 1 and the handle 2 are made of steel, and the handle is attached to the hoop 1 by welding. The hoop is flat in a direction perpendicular to the plane of the partial circle formed by the hoop 1, so that the hoop forms a partial cylinder, the axis of which passes through the center of the circle. The hoop is formed from a flat strip, which is bent to form the partial cylinder. The circle formed by the hoop is incomplete on the side where it is attached to the handle, the steel strip that the hoop is made out of being bent outward at points B and C to form projection 3 and 4, respectively, which are attached to the handle. The handle 2 is conveniently spaced a distance from the hoop 1, so that there is substantial room to insert a hand 5, hook 6, rope or chain 7, as seen in FIG. 2.

The hoop 1 is slipped around the gas cylinder 8 to be lifted, and then the person using it lifts the cylinder, placing his hand 5, or a hook 6, rope or chain 7, on the handle 2. After the cylinder 8 has been moved to its new location, the grip G can then be easily slipped off the gas cylinder 8. When a gas cylinder 8 is held by the grip G, the axis of the gas cylinder being held will tend to tilt or cant slightly relative to the axis of the cylinder 8 formed by the flat hoop 1, so that gas cylinder 8 will contact the hoop 1 only at points B and C on the "top" side of the device and point A on the "bottom" side of the device (or vice versa). The friction at those points A, B and C, will be sufficient to retain the cylinder 8 in the grip when it is being carried. To remove the grip, it is canted back so that the axes of the gas cylinder 8 and the cylinder formed by the hoop 1 are collinear or parallel, which removes the frictional contact at said points, so that the grip G can be easily removed from the gas cylinder 8.

It is to be understood that the present invention is not limited to the sole embodiment described above, but encompasses any and all embodiments within the scope of the following claims.

I claim:

1. An apparatus combination of a grip and a lifting member selected from the group consisting of a hand, a hook, a chain, and combinations thereof for lifting and carrying a gas cylinder, comprising:

a substantially circular and flat band hoop having bent end portions extending outward;

a handle rigidly attached to the hoop at said end portions and lying in a plane described by said band hoop;

the diameter of the band hoop being dimensioned and configured to be slightly larger than the diameter of a gas cylinder to be gripped, lifted and carried, such that, when slightly tilted as by grasping the handle by a member, the grip's hoop is caused to cant to tightly and frictionally engage the cylinder to be carried; and the handle affixed to said hoop is spaced apart a distance from the band hoop, whereby a substantial gap for insertion of a lifting member is provided to facilitate secure grasping of said grip;

whereby, after carrying of the cylinder, said grip's band hoop is canted again to its initial position with said gas cylinder and easily slipped off the gas cylinder.

2. The apparatus combination according to claim 1, wherein the hoop is flat in a direction perpendicular to the plane of the circle formed by the hoop, so that the hoop forms a short cylinder, the axis of which passes through the center of the circle.

3. The apparatus combination according to claim 1, wherein the hoop is made from metal.

4. The apparatus combination according to claim 1, wherein the handle is made from metal.

5. The apparatus combination according to claim 1, wherein the hoop and the handle are made from metal, and the handle is attached to the hoop by welding.

6. The apparatus combination according to claim 1, wherein the lifting member is a hand.

7. The apparatus combination according to claim 1, wherein the lifting member is a hook.

8. The apparatus combination according to claim 1, wherein the lifting member is a rope.

9. The apparatus combination according to claim 1, wherein the lifting member is a chain.

10. The apparatus combination according to claim 1, wherein the lifting member is a hook and a chain.

* * * * *